(12) United States Patent
Holzmann et al.

(10) Patent No.: US 7,413,588 B2
(45) Date of Patent: Aug. 19, 2008

(54) HIGH EFFICIENCY, LOW RESTRICTION, COST EFFECTIVE FILTER

(75) Inventors: Mark V. Holzmann, Stoughton, WI (US); Kelly Ann Detra, Brooklyn, WI (US); Jim L. Alonzo, Sun Prairie, WI (US); Chirag D. Parikh, Madison, WI (US); Gregory J. Schoenmann, Stoughton, WI (US); Michael J. Connor, Stoughton, WI (US); Gary L. Rickle, Warton, OH (US); Barry M. Verdegan, Stoughton, WI (US)

(73) Assignee: Fleetguard, Inc., Nashville, TN (US)

( * ) Notice: Subject to any disclaimer, the term of this patent is extended or adjusted under 35 U.S.C. 154(b) by 398 days.

(21) Appl. No.: 10/997,257

(22) Filed: Nov. 24, 2004

(65) Prior Publication Data

US 2006/0107638 A1 May 25, 2006

(51) Int. Cl.
*B01D 39/00* (2006.01)

(52) U.S. Cl. .............................. 55/502; 55/498; 55/499; 55/500; 55/501; 55/503; 55/521; 55/529; 55/482; 55/459.1; 55/337; 210/282; 210/DIG. 17

(58) Field of Classification Search .......... 55/498–503, 55/521, 529, 482, 459.1, 337; 210/282, DIG. 17
See application file for complete search history.

(56) References Cited

U.S. PATENT DOCUMENTS

| | | | |
|---|---|---|---|
| 2,135,863 A | | 11/1938 | Walker |
| 2,640,789 A | * | 6/1953 | Hausner ..................... 427/247 |
| 3,296,781 A | | 1/1967 | Schumann |
| 4,120,711 A | | 10/1978 | Gudeman |
| 4,181,514 A | * | 1/1980 | Lefkowitz et al. ............. 55/488 |
| 4,211,543 A | * | 7/1980 | Tokar et al. .................... 55/485 |
| 4,243,397 A | * | 1/1981 | Tokar et al. .................... 55/487 |
| 4,418,662 A | | 12/1983 | Engler et al. |
| 4,478,620 A | * | 10/1984 | Tamura ........................ 55/486 |
| 4,617,122 A | | 10/1986 | Kruse et al. |
| 4,720,292 A | | 1/1988 | Engel et al. |
| 4,878,930 A | | 11/1989 | Manniso et al. |
| 5,512,172 A | | 4/1996 | Marble |
| 5,531,892 A | | 7/1996 | Duffy |
| 5,605,625 A | | 2/1997 | Mills |
| 5,679,122 A | | 10/1997 | Moll et al. |

(Continued)

FOREIGN PATENT DOCUMENTS

DE 34 05 719 8/1985

OTHER PUBLICATIONS

Kuss Filter Cup, 2001.

*Primary Examiner*—Duane Smith
*Assistant Examiner*—Minh-Chau T. Pham
(74) *Attorney, Agent, or Firm*—J. Bruce Schelkopf (57) ABSTRACT

A filter includes a filter element formed of filter media, and a plastic framework molded and bonded to and structurally supporting the filter media. One embodiment desirably provides a two-component assembly consisting solely of two components, namely the filter media and the plastic framework molded thereon. In a further embodiment, the plastic framework includes a resilient seal integrally molded therewith and of the same plastic material thereof, eliminating a separate component for the seal. In a further embodiment, a filter combination includes a primary filter element and a secondary filter element. In a further embodiment, a resilient integrally molded seal is provided.

8 Claims, 4 Drawing Sheets

U.S. PATENT DOCUMENTS

| | | | |
|---|---|---|---|
| 5,730,766 A | 3/1998 | Clements | |
| 5,733,452 A | 3/1998 | Whitlock | |
| 5,759,217 A | 6/1998 | Joy | |
| 5,800,581 A | 9/1998 | Gielink et al. | |
| 5,855,783 A | 1/1999 | Shucosky et al. | |
| 5,871,645 A | 2/1999 | Reed et al. | |
| 5,891,337 A | 4/1999 | Keller et al. | |
| 5,902,361 A | 5/1999 | Pomplun et al. | |
| 5,916,435 A * | 6/1999 | Spearman et al. | 210/132 |
| 5,948,146 A * | 9/1999 | Thomaides et al. | 95/273 |
| 5,954,849 A | 9/1999 | Berkhoel et al. | |
| 5,958,097 A | 9/1999 | Schlor et al. | |
| 6,045,598 A | 4/2000 | Fath et al. | |
| 6,045,600 A | 4/2000 | Michaelis et al. | |
| 6,080,311 A | 6/2000 | Martin et al. | |
| 6,093,231 A | 7/2000 | Read et al. | |
| 6,103,119 A | 8/2000 | Clements et al. | |
| 6,132,483 A * | 10/2000 | Andrews | 55/385.1 |
| 6,136,076 A | 10/2000 | Read | |
| 6,149,700 A | 11/2000 | Morgan et al. | |
| 6,247,463 B1 | 6/2001 | Fedorowicz et al. | |
| 6,258,144 B1 * | 7/2001 | Huang | 55/385.3 |
| 6,261,334 B1 | 7/2001 | Morgan et al. | |
| 6,306,193 B1 | 10/2001 | Morgan et al. | |
| 6,319,300 B1 | 11/2001 | Chen | |
| 6,375,699 B1 | 4/2002 | Beck | |
| 6,375,700 B1 | 4/2002 | Jaroszczyk et al. | |
| 6,383,244 B1 | 5/2002 | Wake et al. | |
| 6,391,076 B1 | 5/2002 | Jaroszczyk et al. | |
| 6,402,798 B1 | 6/2002 | Kallsen et al. | |
| 6,416,561 B1 | 7/2002 | Kallsen et al. | |
| 6,433,049 B1 | 8/2002 | Romenesko et al. | |
| 6,447,567 B1 | 9/2002 | Ehrenberg | |
| 6,478,018 B2 | 11/2002 | Fedorowicz et al. | |
| 6,478,019 B2 | 11/2002 | Fedorowicz et al. | |
| 6,482,247 B2 | 11/2002 | Jaroszczyk et al. | |
| 6,511,599 B2 | 1/2003 | Jaroszczyk et al. | |
| 6,568,540 B1 | 5/2003 | Holzmann et al. | |
| 6,641,637 B2 | 11/2003 | Kallsen et al. | |
| 7,070,642 B2 * | 7/2006 | Scott et al. | 55/498 |
| 2002/0040569 A1 * | 4/2002 | Reinhold | 55/498 |

* cited by examiner

HIGH EFFICIENCY, LOW RESTRICTION, COST EFFECTIVE FILTER

BACKGROUND AND SUMMARY

The invention relates to filters, and more particularly to a high efficiency, low restriction, cost effective filter.

There is continuing demand for fluid filters exhibiting high efficiency and low restriction at reduced cost. The present invention addresses and solves this need in a simple and effective manner.

In one desirable option, an incinerable and/or recyclable filter is provided, enabling green label product designation, which is significant in various markets.

DETAILED DESCRIPTION

Figure 1:
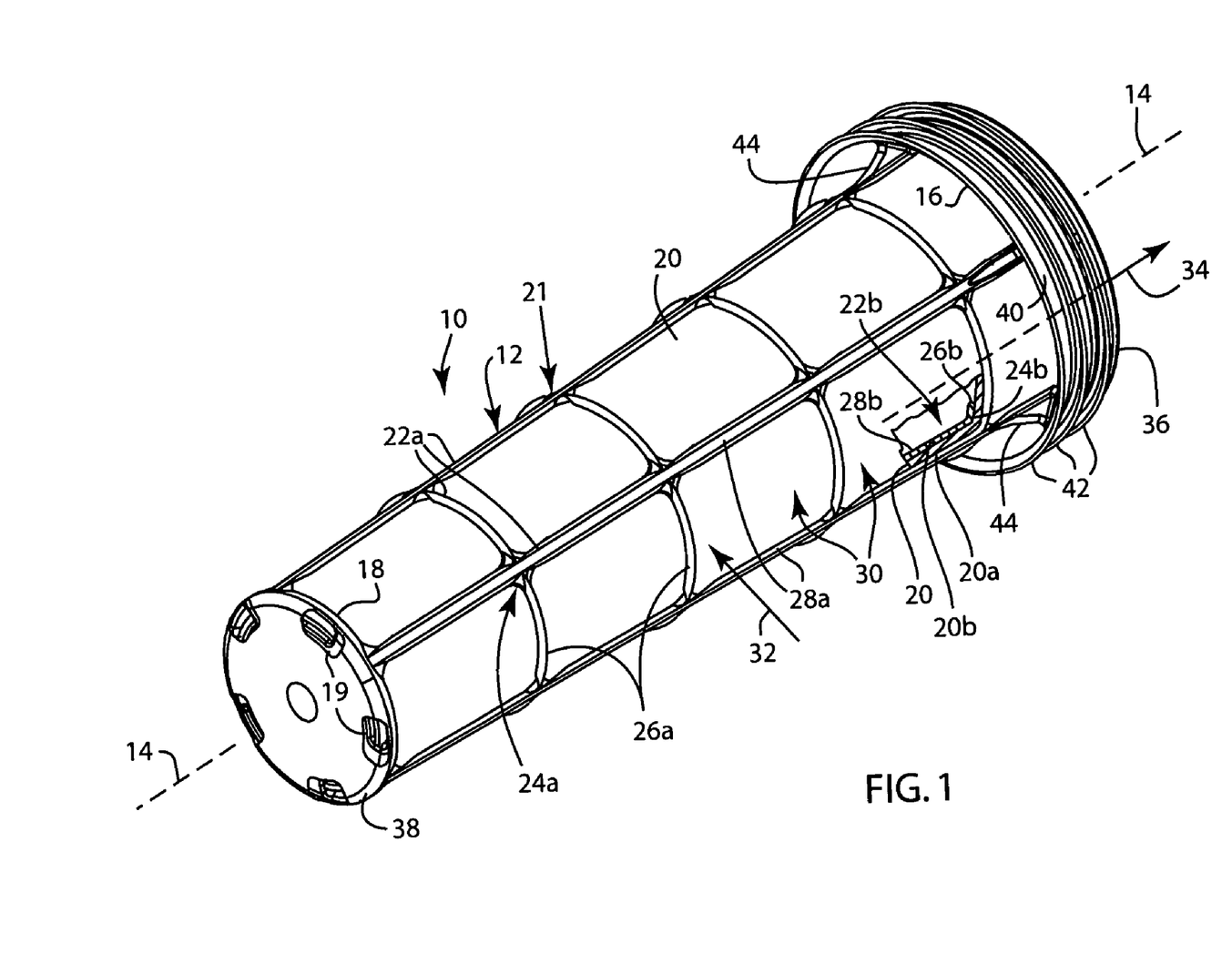
FIG. 1 is a perspective view of a filter element constructed in accordance with the invention.

FIG. 1 shows a filter 10 having an annular filter element 12 with a hollow interior 13 and extending axially along an axis 14 between distally opposite first and second axial ends 16 and 18. The filter element includes filter media 20, preferably high efficiency, low restriction non-pleated non-woven synthetic filter media, to be described, and a plastic framework 21 molded and bonded to and structurally supporting filter media 20. Filter media 20 has an exterior 20a facing exteriorly away from hollow interior 13, and has an interior 20b facing inwardly toward hollow interior 13, as shown at the cut-away portions of FIGS. 1, 2. Framework 21 is preferably provided by an external plastic frame 22a which includes a rib network 24a having a plurality of interconnected ribs extending along the exterior 20a of filter media 20 and bonded thereto, to be described. Rib network 24a includes arcuate ribs such as 26a extending laterally relative to axis 14 and providing the filter media with torsional loading resistance, each of the arcuate ribs being bonded to the filter media. Rib network 24a includes a plurality of axially extending axial ribs such as 28a providing the filter media with columnar compressive loading resistance, each of the axial ribs being bonded to the filter media. Ribs 28a extend along axis 14 and are preferably tapered relative thereto to provide a frusto-conical filter element. Framework 21 is also preferably provided by an internal plastic frame 22b which includes a rib network 24b having a plurality of ribs extending along the interior 20b of filter media 20 and bonded thereto. Rib network 24b includes a plurality of axially extending axial ribs such as 28b providing the filter media with columnar compressive loading resistance, each of the axial ribs being bonded to the filter media. Ribs 28b extend parallel to ribs 28a. Inner rib network 24b includes only axial ribs 28b, but may include partial arcuate ribs such as 26b which do not extend fully arcuately between adjacent axial ribs 28b but instead have a partial arcuate extension formed during mold flow. The outer and inner rib networks 24a, 24b have open areas such as 30 substantially larger than the area of the ribs, for reduced restriction, and reducing structural blockage.

Frame 22a of framework 21 is along the exterior 20a of filter media 20. Frame 22b of framework 21 is along the interior 20b of filter media 20. Filter media 20 is preferably sandwiched between the noted exterior and interior sets of ribs on opposite exterior and interior sides 20a, 20b thereof and bonded respectively thereto. In one embodiment, the filter is an outside-in filter wherein fluid to be filtered flows laterally inwardly through the filter media as shown at arrows 32 into the hollow interior of the filter, and then the clean filtered air flows axially rightwardly in FIG. 1 as shown at arrow 34. The noted bonding and rib structure prevents collapse of filter media 20, which is desirable in high pressure and/or high vacuum situations, and in other applications and conditions where desired, for example severe conditions in an internal combustion engine intake air filtering application involving wet dirty fully loaded combustion intake air. The outer frame protects the filter media from damage during installation. The inner frame prevents media collapse under flow conditions. Both the outer and inner frames provide torsional and compressive strength for installation. The filter may also be used in inside-out applications where the direction of fluid flow is opposite to that noted above, in which embodiment the outer frame prevents media collapse under flow conditions. By bonding the media to the framework, the torsional strength is increased, which helps maintain element integrity during installation.

Ribs 26a, 26b, 28a, 28b are bonded to filter media 20 by at least one of, and preferably both of, a) a chemical bond and b) a mechanical bond. Filter media 20 is composed of material selected from the group consisting of synthetic, glass, cellulose, ceramic, carbon, and metallic material. In a preferred embodiment, in combination each of framework 21 and filter media 20 is composed of material selected from the group consisting of organic, synthetic, and polymeric material selected such that filter element 12 is incinerable. In a further embodiment, each of framework 21 and filter media 20 is composed of thermoplastic material, and further preferably in combination the material of framework 21 and the material of filter media 20 are of the same thermoplastic recycling class such that filter element 12 is recyclable. Further in the preferred embodiment, filter media 20 is composed of fibers, and the material of framework 21 is selected from a family chemically compatible with the material of the fibers to chemically bond ribs 26a, 26b, 28a, 28b of framework 21 to filter media 20, and also such that the plastic material of the ribs entangles some of the media fibers to additionally mechanically bond the ribs of the framework to the filter media, such that the ribs of the framework are both chemically and mechanically bonded to filter media 20. In one embodiment, filter media 20 is provided by polyester fibers, and the material of framework 21 is selected from the group consisting of polyester, polypropylene, and resin. In one embodiment, the material of framework 21 is polyester selected from the same polymeric family as the noted polyester fibers of filter media 20 to chemically bond ribs 26a, 26b, 28a, 28b of framework 21 to filter media 20, and also such that the polyester plastic of ribs 26a, 26b, 28a, 28b of the framework entangles some of the polyester media fibers to additionally mechanically bond ribs 26a, 26b, 28a, 28b of the framework to the filter media 20, such that ribs 26a, 26b, 28a, 28b are both chemically and mechanically bonded to filter media 20. In one embodiment, the material of framework 21 is polyester with glass reinforcement. In another embodiment, the material of framework 21 is polypropylene, and the polypropylene plastic of ribs 26a, 26b, 28a, 28b of the framework entangles some of the polyester media fibers to mechanically bond plastic framework 21 to filter media 20. In one embodiment, the framework material is polypropylene wit glass reinforcement. In another embodiment, the framework material is polypropylene with talc reinforcement. In a further embodiment, the material of framework 21 is a plastic resin.

In further preferred embodiments, the material of filter media 20 is PET (polyethyleneterephthalate) non-woven polyester. The material of framework 21 is preferably chosen from two different plastic families. In the first family, the material of framework 21 is that known under the tradename RYNITE 415HP-BLACK, DuPont Rynite PET Polyester. This type of formulation, involving 15% glass reinforcement with a toughener added in the formulation, was selected because it provides the same polymeric family to be melt bonded during injection molding of the framework to provide a PET plastic to PET media bond, resulting in a more robust structural construction including between media fibers and an integrally molded rib network 24a, 24b and because such polymeric bond also provides some plastic working its way through the fibers of the filter media and providing a mechanical bond as well. This selection was also made because the enhanced robustness provides additional vacuum resistance under severe conditions, including a wet dirty fully loaded primary filter failure when the present filter is used as a secondary filter in combination, to be described. This selection was also made because the enhanced robustness provides additional torsional loading resistance including under severe conditions including loading and unloading during service. This selection was also made because the enhanced robustness provides additional columnar collapse buckling resistance under severe service conditions, including installation with highly compressive loads. This selection was also made because it provides more heat resistance than polypropylene. In the second family, 20% glass-filled or 30% talc-filled polypropylene is selected, with a formulation involving 20% glass reinforcement with a toughener added in the formulation. This selection provides more economical pricing. This selection also provides a dissimilar polymeric family to be mechanically melt bonded via polymer chain entanglement amongst the filter media fibers during the injection molding sequence during molding of framework 21 to provide a polypropylene plastic to PET filter media mechanical bond. This results in a robust structural construction between PET filter media fibers and the integrally molded rib network 24. The remaining reasons for this selection are similar to those above indicated for the first noted family, except that this second family is preferably not used in hot environments above about 180° F. because the plastic of the framework may deflect more easily under loads. Other resins may be used, such as nylon, ABS (acrylonitrile/butadiene/styrene), PPS (polyphenylene sulfide), and the like.

Framework 21 extends axially along axis 14 between distally opposite first and second axial ends 36 and 38 at the noted respective first and second axial ends of the filter element. Framework 21 at the noted ribs is molded to and bonded to filter media 20 along the axial extension thereof. The noted first end 36 of the framework has an outer peripheral surface 40 having one or more resilient seals 42, FIGS. 1, 2, overmolded therewith. Seals 42 and ribs 26a, 26b, 28a, 28b are the same plastic material of the framework 21 and are integrally molded with the framework on filter media 20. Seal 42 is provided by at least one, and in the disclosed embodiment of FIGS. 1, 2, three flexible annular flanges extending obliquely to axis 14 and radially deflectable relative thereto to seal against a circumscribing portion of a filter housing therearound, one embodiment of which is described hereinafter. Rib networks 24a, 24b include the noted plurality of axial ribs 28a, 28b extending axially between first and second axial ends 36 and 38 of the framework. A plurality of trusses 44, FIG. 2, at first axial end 36 of the framework extend radially between respective axial ribs 28a and annular flange 42 for supporting the latter. The noted arcuate ribs 26a extend obliquely to axis 14 and laterally relative to the axial extension of framework 21. Arcuate ribs 26a obliquely point in the same oblique direction as annular flanges 42 providing the noted seal. The seal provided by one or more flanges 42, the axial ribs 28a, 28b, and the arcuate ribs 26a, 26b are all integrally molded on filter media 20 as a single unitary integrally molded framework.

The integral flex seal rings provided by flanges 42 provide not only a flexible seal but also a spring-type retention by forcing the flex rings provided by flanges 42 into a drafted surface, preferably conical. This eliminates the need for providing a seal from urethane potting as in the prior art. The thickness of the rings is selected to provide enough retention under vibration to hold the filter in place and prevent axial backing-out thereof. The retention force is selected so as not to have too much interference, otherwise making installation and extraction difficult, but still provide enough retention to resist vibration induced axial back-out. In a further embodiment, if vibration back-out is of concern, an interference fit retention mechanism may be provided, for example as shown in U.S. Pat. No. 6,383,244, incorporated herein by reference, and further described hereinafter. In such embodiment, intermittent detent undercuts may be provide to hold back the end-most flex ring flange 42 (rightmost in FIG. 1).

It is significant that filter element 12 is a two-piece assembly consisting, in the preferred embodiment, solely of two components, namely filter media 20 and plastic framework 21 molded thereon. The plastic framework includes a resilient seal 42 integrally molded therewith and of the same plastic material thereof, eliminating a separate component for the seal, such that the filter element remains a two-component assembly, including the seal. The framework extends axially along axis 14 between distally opposite first and second axial ends at the noted first and second axial ends of the filter element. Framework 21, including first and second frames 22a and 22b, is an integrally molded singular component, including integral connection between frames 22a and 22b at at least one of and preferably both of the noted first and second axial ends 36 and 38. The filter element remains a two-component assembly consisting solely of two components, namely filter media 20 and framework 21 molded thereon.

Figure 2:
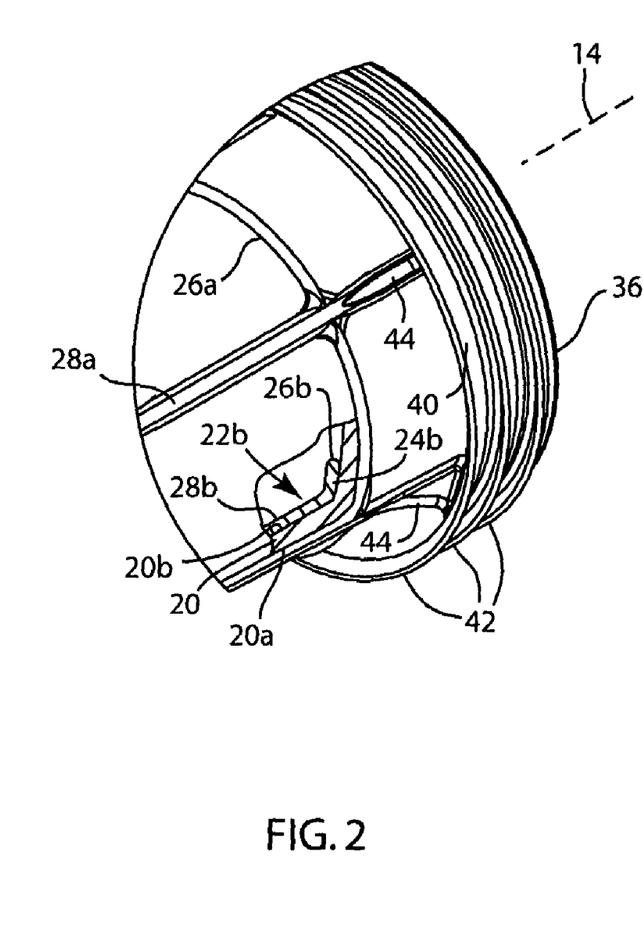
FIG. 2 is an enlarged view of a portion of FIG. 1.
Figure 3:
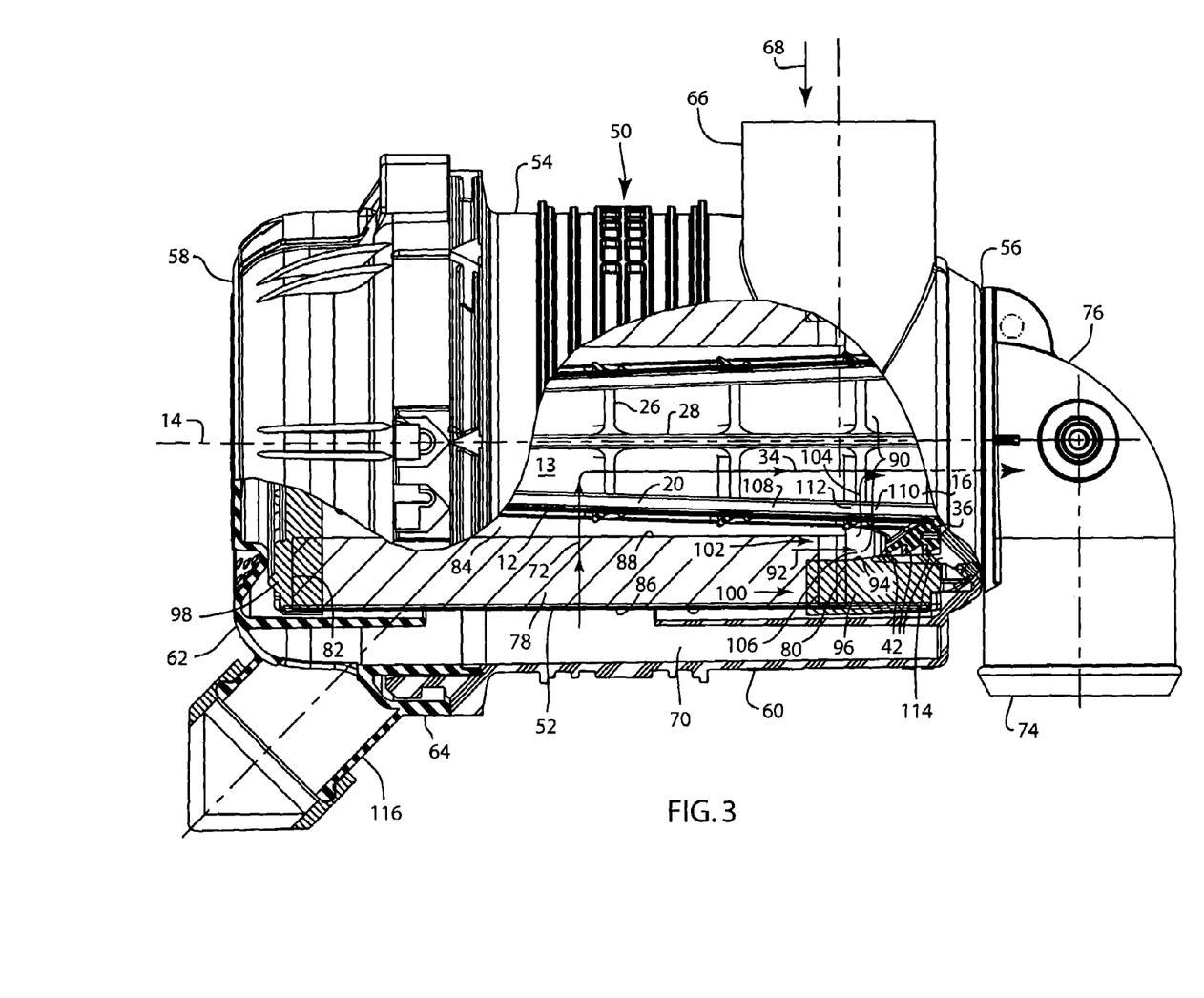
FIG. 3 is a side view partially in section of a filter combination in accordance with the invention.

FIG. 3 illustrates a desirable filter combination and construction, including implementation of the filter element 12 of FIGS. 1, 2 in combination with a primary filter element 52, and uses like reference numerals from above where appropriate to facilitate understanding. Filter 50 includes a housing 54 extending along axis 14 between first and second axial ends 56 and 58 at respective first and second housing sections 60 and 62 mounted to each other at interface 64, as is known, for example as shown in U.S. Pat. Nos. 6,149,700, 6,402,798, incorporated herein by reference. As is known, fluid to be filtered, e.g. air, enters housing inlet 66 as shown at arrow 68 and flows into outer annular chamber 70 in a spiral path and then flows laterally inwardly as shown at arrow 72 through primary filter element 52 and secondary filter element 12 into hollow interior 13 of the latter and then flows axially rightwardly as shown at arrow 34 to housing outlet 74, which may include a 90° elbow at 76, or may be a straight outlet. Annular primary filter element 52 includes pleated filter media 78 extending axially in the housing between first and second axial ends 80 and 82 and having a hollow interior 84, for example as shown in U.S. Pat. Nos. 6,149,700, 6,216,334, 6,306,193, 6,391,076, 6,416,561, 6,641,637, incorporated herein by reference. Annular secondary filter element 12 preferably includes non-pleated non-woven filter media 20 extending axially in hollow interior 84 between first and second axial ends 16, 18, as above described. Secondary filter element 12 further includes the noted plastic molded framework 21 molded and bonded to and structurally supporting non-pleated non-woven filter media 20 in hollow interior 84. As in the noted incorporated '700 patent, pleated filter media 78 of primary filter element 52 has a plurality of pleats in an annulus having an outer perimeter 86 defined by a plurality of outer pleat tips, and an inner perimeter 88 defined by a plurality of inner pleat tips, wherein fluid to be filtered flows through primary filter element 52 from an upstream dirty side at outer annular chamber 70 to a downstream clean side at hollow interior 84, and flows axially in the hollow interior. Also as in the incorporated '700 patent, primary filter element 52 has an axial flow passage 90 extending along axis 14 and including the flow as shown at arrows 34 and 92, and circumscribing hollow interior 84 and having a flow perimeter 94 greater than inner perimeter 88. Flow passage 90 corresponds to flow passage 56 in the incorporated '700 patent. Flow arrows 34 and 92 correspond respectively to flow arrows 58 and 59 in the '700 patent. Outer and inner perimeters 86 and 88 correspond to respective outer and inner perimeters 30 and 34 in the '700 patent. Flow perimeter 94 corresponds to flow perimeter 60 in the '700 patent. Primary filter element 52 has first and second end caps 96 and 98 of soft resilient compressible material, such as foamed potted urethane. End cap 96 has an inner perimeter at 94 greater than inner perimeter 88. End cap 96 corresponds to end cap 66 of the incorporated '700 patent and partially covers the rightward axial ends of the pleats of pleated filter media 78 such that the laterally outward portions 100 of the axial ends of the pleats are covered by end cap 96 but not the laterally inward portions 102 of the axial ends of the pleats, such that the laterally inward portions 102 (corresponding to laterally inward portions 74 in the incorporated '700 patent) are uncovered and exposed at the rightward axial end of filter element 52, to in turn allow axial flow therethrough as shown at arrow 92, corresponding to axial flow at 59 in the incorporated '700 patent. This additional or increased axial flow is also shown in the noted incorporated U.S. Pat. Nos. 6,261,334, 6,306,193, 6,391,076, 6,416,561, 6,641,637.

Secondary filter element 12 in FIG. 3 is downstream of primary filter element 52 and filters both the flow in the hollow interior and the additional flow 92 between flow perimeter 94 and inner perimeter 88. The additional flow 92 turns laterally inwardly as shown at arrow 104 and flows through secondary filter element 12 and joins axial flow 34. First axial end 16 of non-pleated non-woven filter media 20 of the secondary filter element extends axially beyond first axial end 80 of pleated filter media 78 of the primary filter element 52 and is axially spaced therefrom by an axial gap 106 therebetween. Non-pleated non-woven filter media 20 has a first section 108 radially aligned with pleated filter media 78 of primary filter element 52, and has a second section 110 radially aligned with axial gap 106. The junction 112 of first and second sections 108 and 110 is radially aligned with axial end 80 of pleated filter media 78. Fluid flow through the filter has a first path as shown at 72 flowing laterally from pleated filter media 78 then laterally through first section 108 of non-pleated non-woven filter media 20, and has a second additional path flowing axially at 92 from axial end 80 of pleated filter media 78 through the area 102 between flow perimeter 94 and inner perimeter 88 then turning in axial gap 106 as shown at arrow 104 and flowing laterally through second section 110 of non-pleated non-woven filter media 20. Axial gap 106 is axially between end cap 36 of secondary filter element 12 and axial end 80 of pleated filter media 78. End cap 96 of primary filter element 52 circumscribes both axial gap 106 and end cap 36 of secondary filter element 12. Filter housing 54 at outlet end 56 has an annular flange 114 extending axially between end cap 96 of primary filter element 52 and end cap 36 of secondary filter element 12 and engaging and sealing each of end caps 96 and 36. A detent retention arrangement may also be provided for further retaining the secondary element, for example as shown at detent 60 and flange 46 in U.S. Pat. 6,383,244, incorporated herein by reference. Filter housing 54 further includes a valved discharge purge outlet 116 for purging collected particulate contaminant, as is known. It is preferred that filter element 12 taper from a first lateral cross-sectional area at first axial end 16 to a second lateral cross-sectional area at second axial end 18, FIG. 1, and that the noted second lateral cross-sectional area be less than the noted first lateral cross-sectional area. The resulting frusto-conical shape provides a large open area at the rightward outlet end 16 in FIG. 3 and makes the filter element 12 well suited for use as a secondary filter element for the noted primary filter element 52 of the above noted incorporated patents providing the noted additional flow. The arrangement in combination provides reduced restriction within a small package satisfying increasingly demanding space constraints and affording high efficiency, all while being environmentally friendly. The integral seal construction at integrally molded flanges 42 engaging housing flange 114 is particularly cost effective.

Figure 4:
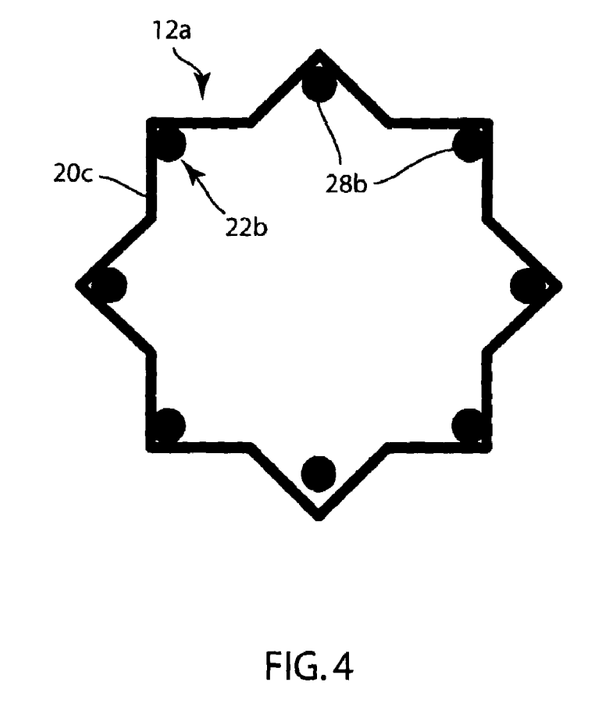
FIG. 4 is a schematic end view of an alternate embodiment of a filter element in accordance with the invention.
Figure 5:
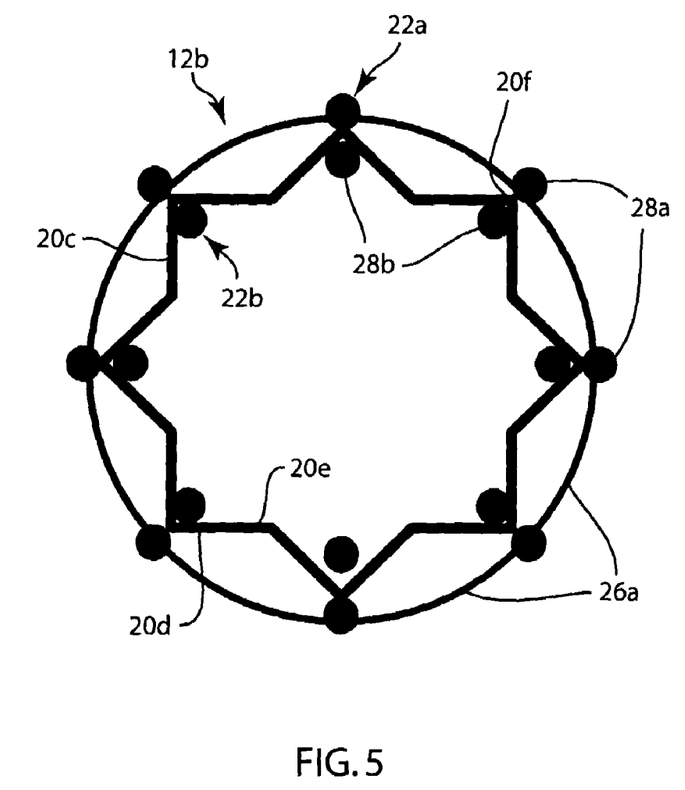
FIG. 5 is like FIG. 4 and shows another embodiment.

Further embodiments include pleated and non-pleated filter media used with a plastic framework having only an outer frame or only an inner frame or both an outer frame and an inner frame. FIG. 4 shows a filter element 12a having pleated filter media 20c bonded to inner plastic frame 22b including axial ribs 28b. FIG. 5 shows filter element 12b having pleated filter media 20c bonded to a plastic framework including plastic frame 22b having axial ribs 28b, and plastic frame 22a having axial ribs 28a and arcuate ribs 26a. Filter media 20c has an upstream dirty side, e.g. 20d for an outside-in flow filter, comparable to 20a, and a downstream clean side 20e, comparable to 20b. The framework is provided by first plastic frame 22a along upstream dirty side 20d of the filter media, and a second plastic frame 22b along downstream clean side 20e of the filter media. Frame 22a includes the noted rib network having a set of ribs 28a extending along upstream dirty side 20d of the filter media at the pleat tips or creases or bend lines 20f and bonded thereto. Frame 22b is provided by the noted rib network including ribs 28b extending along downstream clean side 20e of the filter media and bonded thereto along the interior of the noted pleat tips 20f. Filter media 20c is sandwiched between the sets of ribs 28a and 28b on opposite upstream and downstream sides 20d and 20e of the filter media and bonded respectively thereto.

In further preferred embodiments, the filter media is oiled and die cut and then sonically welded into a conical pre-form before it is overmolded with the plastic framework. The seam from the sonic weld is aligned along one of the noted axial ribs, so that the seam is sealed by and bonded to the plastic, minimizing a possible leak path. Stand-offs such as 19 are provided at end 38 to space the end of the media slightly from the end of the mold so that the molten plastic is free to flow around the media to both the inner and outer ribs at such end. Inner trusses, comparable to trusses 44, may be provided on the interior of the element for stress bearing. The molten plastic is preferably injected at end 36, and media end 18 may include portions which are recessed or otherwise slightly pushed away from the axial end to provide a flow path for the molten plastic and to prevent damming thereat.

It is recognized that various equivalents, alternatives and modifications are possible within the scope of the appended claims. Each of the noted annular filter elements is preferably a circular annulus, though other annular shapes may be used, including elliptical, racetrack-shaped, and other closed-loop annuli. The shapes may or may not be frusto-conically tapered. The teachings of the invention may further be applied to flat panel filter elements, as well as other shapes. The noted ribs may alternatively be provided by applying heated bars to partially melt and flatten sections of the filter media into a ribbed structure, i.e. ironing ribs into the media. The preferred implementation is an air filter, though other fluid filter applications are possible. In an air filter, the open areas between the ribs can be larger, since there are lower pressure drop requirements than a liquid filter. For ease of service, a circular seal may be preferred between the filter element and the housing, for example at seal 42 and the housing at flange 114. In a desirable implementation, the filter element is installed by pressing it or slightly twisting it into the receptacle housing at 114 while applying pressure. The louvered, annular barbs at 42 seal against the internal surface at 114 of the circular mounting hole in the housing, a duct, or an air handling conduit. As the filter element slides into the receptacle, semi-rigid semi-flexible plastic or thermoplastic barbs 42 flex slightly inwardly, and preferably semi-rigid semi-flexible plastic or thermoplastic walls of the receptacle at 114 flex slightly outwardly, to secure and seal the filter element. A radial seal is formed between the one or more flexible barbs 42 and the receptacle at flange 114, and, if desired, an axial face seal can be formed where the axial end 36 of the filter element meets the facing annular surface of the receptacle. To remove the filter element, the service technician twists and/or applies a lateral force to free the face of the filter element from the holder at 114. In a further embodiment, the filter element is an annular filter element 12 extending axially along axis 14 between the noted distally opposite first and second axial ends 16 and 18, and framework 21 extends axially along axis 14 between distally opposite first and second axial ends 36 and 38 at respective first and second axial ends 16 and 18 of filter element 12, and the noted first end of the framework has inner and outer peripheral surfaces, and the noted resilient seal is integrally molded with at least one of such surfaces.

What is claimed is:

1. A filter element comprising filter media, and a plastic framework overmolded to and structurally supporting said filter media, wherein said filter media comprises fibers, said framework comprises a rib network comprising a plurality of ribs, and the material of said framework is selected from a family chemically compatible with the material of said fibers to chemically bond said ribs of said framework to said filter media, and also such that the plastic material of said ribs of said framework entangles some of said media fibers to additionally mechanically bond said ribs of said framework to said filter media, such that said ribs of said framework are both chemically and mechanically bonded to said filter media, wherein said filter element is an annular filter element extending axially along an axis between distally opposite first and second axial ends, said framework extends axially along said axis between distally opposite first and second axial ends at respective said first and second axial ends of said filter element, and first end of said framework has an outer peripheral surface having a resilient seal integrally overmolded therewith, wherein said seal comprises at least one flexible annular flange extending obliquely relative to said axis and radially deflectable relative to said axis, and wherein said ribs comprise a plurality of axial ribs extending axially between said first and second axial ends of said framework, and comprising a plurality of trusses at said first axial end of said framework extending radially between said axial ribs and said annular flange providing said seal.

2. The filter element according to claim 1 wherein said ribs comprise a plurality of arcuate ribs extending laterally relative to the axial extension of said framework.

3. A filter element comprising filter media, and a plastic framework overmolded to and structurally supporting said filter media, wherein said filter media comprises fibers, said framework comprises a rib network comprising a plurality of ribs, and the material of said framework is selected from a family chemically compatible with the material of said fibers to chemically bond said ribs of said framework to said filter media, and also such that the plastic material of said ribs of said framework entangles some of said media fibers to additionally mechanically bond said ribs of said framework to said filter media, such that said ribs of said framework are both chemically and mechanically bonded to said filter media, wherein said filter element is an annular filter element extending axially along an axis between distally opposite first and second axial ends, said filter element has a hollow interior, said filter media has an interior facing said hollow interior, and has an exterior facing away from said hollow interior, said framework comprises a first plastic frame along said exterior of said filter media, and a second plastic frame along said interior of said filter media, said first frame comprising a first rib network comprising a first set of a plurality of ribs extending along said exterior of said filter media and overmolded thereto, and said second frame comprises a second rib network comprising a second set of a plurality of ribs extending along said interior of said filter media and overmolded thereto, wherein said filter media is sandwiched between said first and second sets of ribs on opposite exterior and interior sides thereof and overmolded bonded respectively thereto, said framework extends axially along said axis between distally opposite first and second axial ends at respective first and second axial ends of said filter element, said framework, including said first and second frames, is an integrally molded singular component, including an integral connection between said first and second frames at at least one of said first and second axial ends.

4. A filter comprising a housing extending along an axis between first and second axial ends, an annular primary filter element comprising filter media extending axially in said housing between first and second axial ends and having a hollow interior, an annular secondary filter element comprising filter media extending axially in said hollow interior between first and second axial ends, said secondary filter element further comprising a plastic framework overmolded to and structurally supporting said filter media of said secondary filter element in said hollow interior of said primary filter element, wherein said filter media of said primary filter element has a plurality of pleats in an annulus having an outer perimeter defined by a plurality of outer pleat tips, and an inner perimeter defined by a plurality of inner pleat tips, wherein fluid to be filtered flows through said primary filter element from an upstream dirty side to a downstream clean side, and flows axially in said hollow interior, said primary filter element having an axial flow passage extending along said axis and circumscribing said hollow interior and having a flow perimeter greater than said inner perimeter, said secondary filter element being downstream of said primary filter element and filtering both the flow in said hollow interior and additional flow between said flow perimeter and said inner perimeter, wherein:

said first axial end of said filter media of said secondary filter element extends axially beyond said first axial end of said pleated filter media and is axially spaced therefrom by an axial gap therebetween;

said filter media of said secondary filter element has a first section radially aligned with said pleated filter media, and has a second section radially aligned with said axial gap, the junction of said first and second sections being radially aligned with said first axial end of said pleated filter media, such that fluid flow through said filter has a first path flowing laterally from said pleated filter media then laterally through said first section of said filter media of said secondary filter element, and has a second additional path flowing axially from said first axial end of said pleated filter media through the area between said flow perimeter and said inner perimeter then turning in said axial gap and flowing laterally through said second section of said filter media of said secondary filter element.

5. The filter according to claim 4 wherein:

said primary filter element has first and second end caps at said first and second ends, respectively, of said pleated filter media;

said secondary filter element has first and second end caps at said first and second ends, respectively, of said filter media of said secondary filter element;

said axial gap is axially between said first end cap of said secondary filter element and said first axial end of said pleated filter media;

said first end cap of said primary filter element circumscribes both said axial gap and said first end cap of said secondary filter element.

6. The filter according to claim 5 wherein said first end cap of said secondary filter element is integrally molded with said plastic framework and of the same plastic material thereof.

7. The filter according to claim 6 wherein said first end cap of said secondary filter element includes a resilient seal integrally molded therewith and of the same plastic material thereof and resiliently sealed to at least one of said first axial end of said housing and said first end cap of said primary filter element.

8. The filter according to claim 7 comprising flange structure at said first axial end of said housing engaging and sealing each of said first end cap of said primary filter element and said first end cap of said secondary filter element.

* * * * *